Nov. 14, 1944. T. E. TORRISON 2,362,595

ICE CREAM CONE HOLDER

Filed Sept. 30, 1943

Inventor

Theodore E. Torrison

By Carlsen & Hagle

Attorneys

Patented Nov. 14, 1944

2,362,595

UNITED STATES PATENT OFFICE 2,362,595

ICE CREAM CONE HOLDER

Theodore E. Torrison, Robbinsdale, Minn.

Application September 30, 1943, Serial No. 504,493

4 Claims. (Cl. 229—1.5)

This invention relates to holders for ice cream cones.

In the eating of the confection known as the ice cream cone there is a tendency for the ice cream to melt and run down the outer sides of the cone itself, in the form of drippings which soil the hands. It is the primary object of my invention to provide means for eliminating this unsanitary and unsatisfactory feature of such cones, in the form of a holder in which the cone is received and held in the hand, and into which the drippings are caused to run, so that they are prevented from coming into contact with the hand.

Another object is to provide a holder in the form of a paper cone, or a hollow conical holder member of flexible, inexpensive and impervious material, which has a closed lower end and an open upper end to loosely receive the cone, and with means at its upper end turned inwardly therefrom for supportably engaging the cone and for providing space for receiving the drippings.

Still another object is to provide a holder member of this character which is extremely simple and inexpensive and which may be formed up from a suitably shaped blank of paper or similar material and which may bear advertising indicia making it useful as an advertising give away article.

These and other more detailed and specific objects will be disclosed in the course of the following specification, reference being had to the accompanying drawing, in which—

Figure 1:
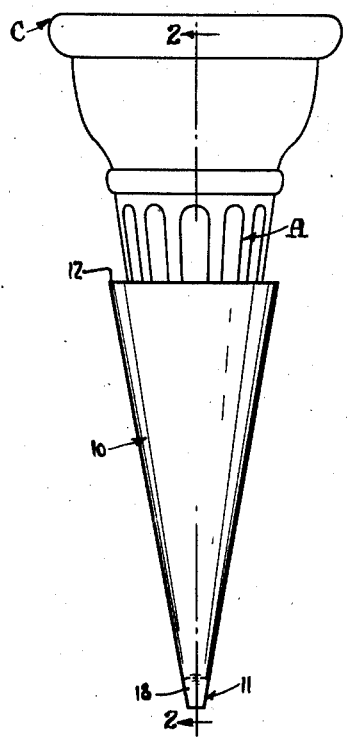
Fig. 1 is a side elevation of a cone as in place in my holder.

Referring now more particularly and by reference characters to the drawing, A represents an ice cream cone of a conventional form, same being made of a pastry material bearing any surface ornamentation and being of generally inverted conical shape having a closed lower end B and an open upper end C in which is seated the usual body of ice cream, not here shown. In use the cone is usually held in the hand as the ice cream is eaten and in the process the ice cream has a tendency to melt and run down the outer surfaces or sides D of the cone, where these drippings come in contact with and soil the hand holding the cone, as is well known.

To prevent this I provide a holder, designated generally at 10, which takes the form of an inverted conical, hollow member having a closed lower end 11 and an open upper end 12. This holder thus corresponds to the shape of the ice cream cone A itself but is shorter and is adapted to loosely receive the lower "handle" part of the cone, as clearly shown.

Figure 2:
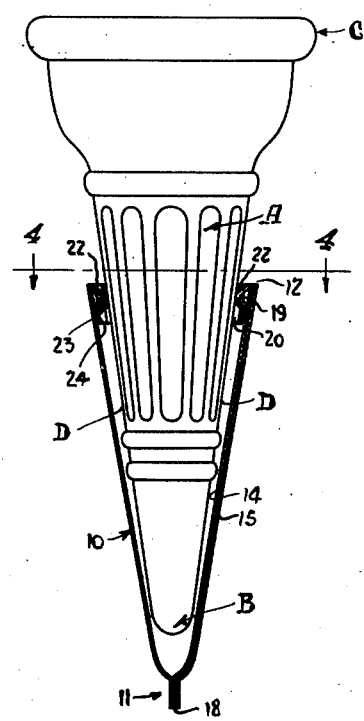
Fig. 2 is a vertical sectional view along the line 2—2 in Fig. 1.

This holder may be conveniently formed from a blank 13 of paper or similar inexpensive, flexible and comparatively impervious material which is of generally triangular shape having angularly meeting side edges 14 and 15 and an arcuate edge 16. The blank is rolled or turned until the edges 14—15 overlap a short distance and they are secured together by a suitable adhesive applied to one, as represented at 17, thus forming the paper cone as shown. The lower end of the cone is pinched together and likewise secured together as seen at 18 in Figs. 1 and 2.

Figure 3:
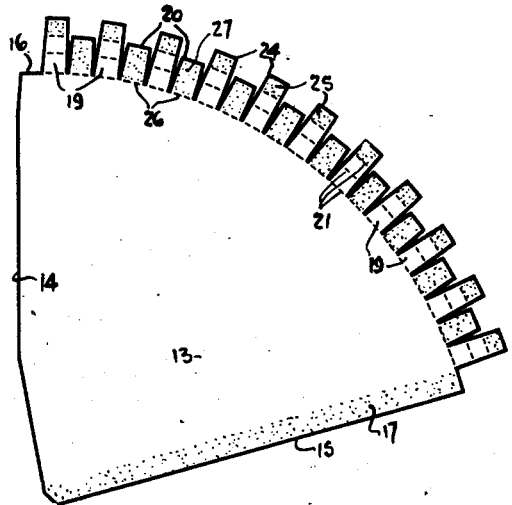
Fig. 3 is a plan view of the blank used in forming my holder.

The arcuate edge 16 of the blank is provided with a series of spaced, extended tabs or tab members 19 between which similar, but shorter, tongues or secondary tabs 20 are provided. In use the tabs 19 are folded or crimped each along the three fold lines 21, shown in Fig. 3, so that the tabs first turn inward and downward as designated at 22 (Fig. 2) and then back outwardly and downwardly as indicated at 23, the ends 24 of the tabs, which are coated with an adhesive as shown at 25 in Fig. 3 being then secured to the interior of the holder. The shorter tabs 20 are turned straight down on fold lines 26 to the inside of the holder and secured thereto by the adhesive 27 with which they are coated. The shorter tabs 20 thus serve to stiffen and reinforce the upper edge of the holder.

Figure 4:
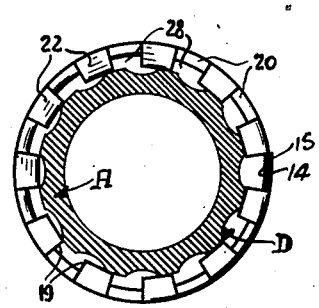
Fig. 4 is an enlarged cross section along the line 4—4 in Fig. 2.

The tabs 19 thus supportably engage the surfaces D of the cone A and the intervening spaces 28 (Fig. 4) formed therebetween serve to receive and guide the drippings from the ice cream down into the holder where they are collected without soiling the hand, which now grasps the holder instead of the cone.

The inwardly sloping surfaces 22 of the tabs 19, when they are formed as shown, serve to guide the drippings, which meet them, toward the cone A and prevent such drippings from running down to the outside of the holder itself.

Obviously the paper blanks are very inexpensive and suitable for advertising use. They may be stored flat and folded to shape as required or may be supplied formed to final shape and nested. The various overlapping edges and tabs may be either adhesive coated as here shown, or a suitable adhesive applied as the blanks are formed to shape if desired.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A holder for an ice cream cone for receiving drippings from the cone and protecting the hand from such drippings, comprising a holder member of a shape corresponding to that of the cone itself and formed of a flexible material, the said holder member having a closed lower end and an open upper end for loosely receiving the cone, and tab members turned inwardly and downwardly from the upper end of the holder member for engaging the cone and supporting it in spaced relation within said holder member, said tab members being spaced apart where they meet said upper end of the holder member to thereby form spaces for the passage of drippings downwardly within said member.

2. A holder for an ice cream cone for receiving drippings from the cone and protecting the hand from such drippings, comprising a holder member of a shape corresponding to that of the cone itself and formed of a flexible material, the said holder member having a closed lower end and an open upper end for loosely receiving the cone, tab members turned inwardly and downwardly from the upper end of the holder member for engaging the cone and supporting it in spaced relation within said holder member, the said tab members being spaced apart at their junctions with the upper end of the holder member forming spaces for the passage of drippings downwardly within said upper end, and the said tab members having inwardly and downwardly sloping upper surfaces for guiding drippings toward the cone and downwardly into the holder member.

3. A holder for an ice cream cone for receiving drippings from the cone and protecting the hand from such drippings, comprising a holder member of a shape corresponding to that of the cone itself and formed of a flexible material, the said holder member having a closed lower end and an open upper end for loosely receiving the cone, spaced tabs turned angularly inward and downward from the upper end of the holder member and secured at lower ends to the interior of the holder member, and shorter tabs turned straight downwardly between the first mentioned tabs and also secured to the interior of the holder member for stiffening and reinforcing the upper end thereof.

4. An ice cream cone holder for receiving drippings from the cone, comprising a holder member having a closed lower end and an open upper end to loosely receive the cone, spaced tab members turned inwardly and downwardly at the upper end of the holder member for engaging the cone, and other tab members turned straight downwardly between said spaced tab members and adapted to clear the cone.

THEODORE E. TORRISON.